(12) United States Patent
Sun et al.

(10) Patent No.: US 7,379,611 B2
(45) Date of Patent: May 27, 2008

(54) GENERIC IMAGE HALLUCINATION

(75) Inventors: Jian Sun, Beijing (CN); Heung-Yeung Shum, Bellevue, WA (US); Hai Tao, Santa Cruz, CA (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 10/817,471

(22) Filed: Apr. 1, 2004

(65) Prior Publication Data

US 2005/0220355 A1 Oct. 6, 2005

(51) Int. Cl.
*G06K 9/32* (2006.01)
*G06K 9/40* (2006.01)

(52) U.S. Cl. .................. 382/254; 382/263; 382/264; 382/266; 382/274; 382/299

(58) Field of Classification Search ............ None
See application file for complete search history.

(56) References Cited

U.S. PATENT DOCUMENTS

| | | | |
|---|---|---|---|
| 6,263,103 B1 * | 7/2001 | Freeman et al. | 382/173 |
| 6,380,934 B1 * | 4/2002 | Freeman et al. | 345/419 |
| 6,434,280 B1 * | 8/2002 | Peleg et al. | 382/299 |
| 6,766,067 B2 * | 7/2004 | Freeman et al. | 382/299 |

OTHER PUBLICATIONS

Baker et al. "Hallucinating Faces", Technical Report TR-99-32, The Robotics Insitute, Carnegie Mellon University, Sep. 1999, pp. 1-6.*

Bockaert, "Interpolation", Digital Imaging:Glossary:Learn:Digital Photography Review, hhtp://www.dpreveiw.com/learn;?key=interpolation. pp. 1-3.*

Guo et al., "Primal Sketch:Intergrating Texture and Structure", Mar. 21, 2005, Department of Statistics, UCLA, pp. 1-37.*

Okada et al, "Analysis and Synthesis of Pose Variations of Human Faces by a Linear PCMAP Model and its Application for Pose Invariant Face Recognition System", Mar. 28, 2000, IEEE Automatic Face and Gesture Recognition 2000, pp. 142-149.*

Toro et al, "Recovery of Two Transparent Primitive Images from Two Frames", May 17, 2004, IEEE Acoustics, Speech, and Signal Processing Proceedings, 2004. , vol. 3, pp. III-225-III-228.*

Chi et al., "Algorithm of Image Enhancement Based on Order Morphology Filtering and Image Entrophy Difference", Aug. 18, 2005, Proceedings of the 4th International Conference on Machine Learning and Cybernetics, pp. 5105-5110.*

(Continued)

*Primary Examiner*—Mia M. Thomas
(74) *Attorney, Agent, or Firm*—Lee & Hayes, PLLC

(57) ABSTRACT

Techniques are disclosed to enable generation of a high-resolution image from any generic low-resolution image. In one described implementation, a method includes extracting, at a training phase, a plurality of primal sketch priors from training data. At a synthesis phase, the plurality of primal sketch priors are utilized to improve a low-resolution image by replacing one or more low-frequency primitives extracted from the low-resolution image with corresponding ones of the plurality of primal sketch priors.

22 Claims, 7 Drawing Sheets
(3 of 7 Drawing Sheet(s) Filed in Color)

OTHER PUBLICATIONS

Gunturk et al., "Eigen face-Domain Super Resolution for Face Recognition", IEEE Transactions on Image Processing, vol. 12, No. 5, May 2003, pp. 597-605.*

Li et al. "Face Hallucination with Pose Variation", May 17, 2004, IEEE 6th International Conference on Automatic Face and Gesture Recognition 2004, pp. 723-728.*

Liu et al. "Face Hallucination: Theory and Practice", Feb. 15, 2007, Computer Science and Artifical Intelligence Lab, MIT, Massachusetts, USA, pp. 1-33.*

Sun et al. "Image Hallucination with Primal Sketch Priors", Jun. 18-20, 2003, IEEE Computer vision and Pattern Recongition, vol. 2, pp. 729-736.*

Guo et al. "Toward a Mathematical Theory of Primal Sketch and Sketchability", Apr. 2003, Proceedings of the 9th International Conference on Computer Vision (ICCV '03), pp. 1-8.*

Hertzmann, A., Jacobs, C. E., Oliver, N., Curless, B., Salesin D. H.; "Image Analogies" SIGGRAPH 2001, 14 pgs.

Lee, A. B., Pedersen, K. S., Mumford, D.; "The Complex Statistics of High-Contrast Patches in Natural Images" SCTV 2001, 31 pgs.

Baker, S., Kanade, T.; "Limits on Super-Resolution and How to Break Them" CVPR 2000, 36pgs.

Freeman, W. T., Pasztor, E. C., Carmichael, O. T.; Learing Low-Level Vision International Journal of Computer Vision, 2000, pp. 25-47.

Irani, M., Peleg, S.; "Motion Analysis for Image Enhancement: Resolution, Occlusion and Transparency" JVCI 1993, 24 pgs.

Morse, B. S., Schwartzwald, D.; "Image Magnification Using Level-Set Reconstruction" CVPR 2001, 8 pgs.

Mount, D., Arya, S.; "ANN: Library for Approximate Nearest Neighbor Searching" published on the internet at http://www.cs.umd.edu/mount/ANN at least as early as Jan. 2004, 2 pgs.

Perona, P., Malik, J.; "Detecting and Localizing Edges Composed of Steps, Peaks and Roofs" ICCV 1990, pp. 52-57.

Li, X., Orchard, M.T.; "New Edge-Directed Interpolation" IEEE 2001, pp. 1521-1527.

Mumford, D.; "Pattern Theory: the Mathematics of Perception"ICM 2002 vol. 3, 21 pgs.

van Hateren, J.H., van der Schaaf, A.; "Independent Component Filters of Natural Images Compared with Simple Cells in Primary Visual Cortex" Proceeding so fthe Royal Society ser B. 1998 pp. 359-366.

Liu, C., Shum, H.-Y., Zhang, C.-S.; "A Two-Step Approach to Hallucinating Faces: Global Prametric Model and Local Nonparametric Model" CVPR 2001, 7 pgs.

Sun, Shum, Zheng: "Stereo Matching Using Belief Propagation" ECCV 2002, LNCS 2351, pp. 510-524, 2002.

* cited by examiner

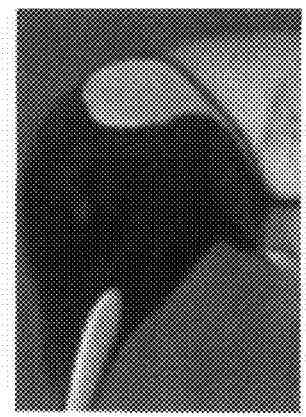
ORIGINAL IMAGE
*Fig. 1*
BICUBIC
*Fig. 3 Prior Art*
GENERIC IMAGE HALLUCINATION
*Fig. 5*
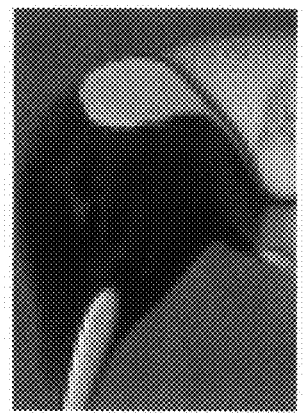
NEAREST NEIGHBOR
*Fig. 2 Prior Art*
BACKPROJECTION
*Fig. 4 Prior Art*

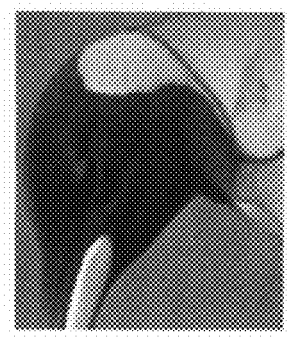
$I_H$
FIG. 11
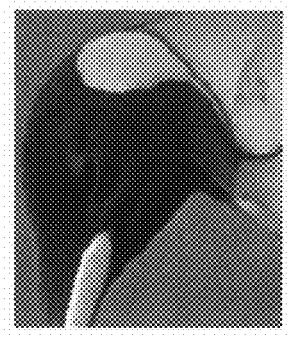
$F_H^s$
FIG. 10
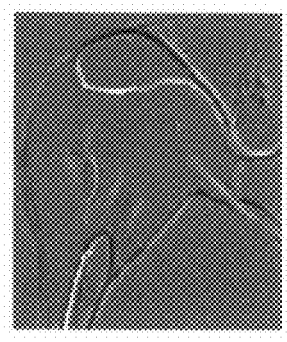
$F_H^c$
FIG. 9
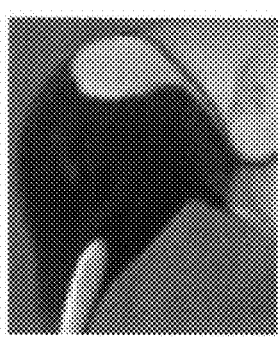
$I_H$
FIG. 8
$I_L$
FIG. 7
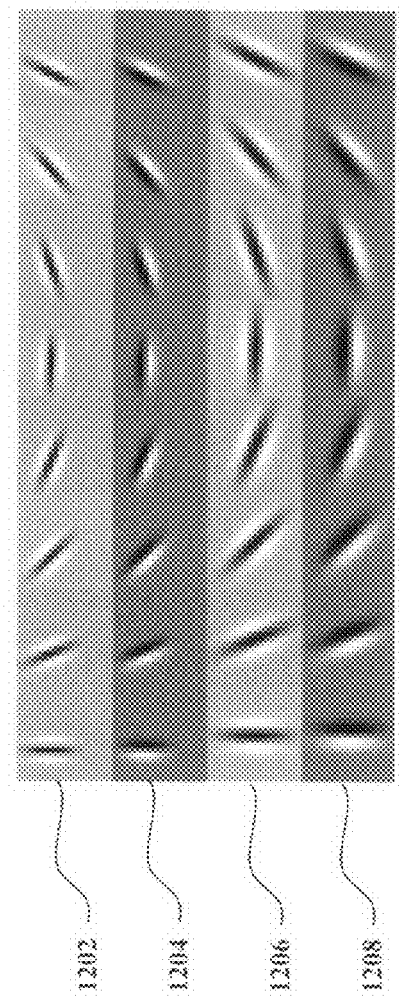
FILTER BANK
FIG. 12
1202
1204
1206
1208
TYPICAL PRIMITIVES
FIG. 13

PRIMITIVE TRAINING DATA

COMPONENT TRAINING DATA

LOW-FREQUENCY IMAGE

EXTRACTED CONTOUR PATCHES

NEAREST NEIGHBOR

MARKOV CHAIN

GENERIC IMAGE HALLUCINATION

TECHNICAL FIELD

The present invention generally relates to image processing, and more particularly, to generic image hallucination.

BACKGROUND

As digital imaging becomes more commonplace, improving image quality becomes a central goal of many image processing applications. Many of the existing applications utilize the data within a digital image to extrapolate more pixels, thereby adding more detail to the image at hand (also known as super-resolution).

Most super-resolution techniques require multiple low resolution images to be aligned in sub-pixel accuracy. Image super-resolution from a single image, however, introduces a more complicated problem. More specifically, single image super-resolution is an under-constrained problem because many high resolution images can produce the same low resolution image.

Current solutions for single image super-resolution include functional interpolation and reconstruction-based ones. Functional interpolation methods often blur the discontinuities and do not satisfy the reconstruction constraint. Under the reconstruct constraint, the down-sampled high resolution reconstructed image should be as close as possible to the original low resolution image.

FIG. 1 illustrates a sample image utilized to illustrate the shortcomings of the prior art. A portion of FIG. 1 (102) will be utilized as a reference image for comparison purposes. FIGS. 2 and 3 show the results of nearest neighbor interpolation (simple copying of neighboring pixels) and bicubic interpolation (functional interpolation) of a low resolution image, respectively.

Reconstruction-based methods satisfy the reconstruction constraint but cannot guarantee contour smoothness. FIG. 4 shows the result of a reconstruction-based approach using backprojection. As illustrated, some "jaggy" and "ringing" artifacts are clearly visible along the edges.

Accordingly, the present solutions fail to provide single image super-resolution without visible artifacts.

SUMMARY

Techniques are disclosed to enable generation of a high-resolution image from any generic low-resolution image.

In one described implementation, a method includes extracting, at a training phase, a plurality of primal sketch priors (e.g., with more details regarding edges, ridges, and/or corners) from training data. At a synthesis phase, the plurality of primal sketch priors are utilized to improve a low-resolution image by replacing one or more low-frequency primitives extracted from the low-resolution image with corresponding ones of the plurality of primal sketch priors.

In another described implementation, a method of generating a high-resolution image from a generic low-resolution image includes extracting a plurality of low-frequency primitives from a low-resolution image. The method further replaces one or more respective ones of the plurality of low-frequency primitives with corresponding primitives from stored training data to provide a high-frequency primitive layer of the low-resolution image.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

The patent or application file contains at least one drawing executed in color. Copies of this patent or patent application publication with color drawing(s) will be provided by the Office upon request and payment of the necessary fee.

FIG. 1 illustrates a sample image utilized to illustrate the shortcomings of the prior art.

FIGS. 2 and 3 show the results of conventional nearest neighbor interpolation and bicubic interpolation techniques applied to a low resolution image respectively.

FIG. 4 shows the result of a conventional reconstruction-based approach applied to the same low resolution.

FIG. 5 illustrates the resulting image after application of generic image hallucination to the sample bird image shown in FIGS. 2-4.

FIGS. 7-11 illustrate sample images corresponding to different stages of the flow diagram of FIG. 6.

FIG. 12 illustrates an exemplary filter bank utilized for generic image hallucination.

FIG. 13 illustrates exemplary extracted patches for a given subclass of primal sketch priors.

DETAILED DESCRIPTION

The following disclosure describes a learning-based approach to construct a high-resolution image from any generic low-resolution image. To accomplish this, stored training data is used. The training data is generated by comparing pairs of low resolution and high resolution versions of a same image. More specifically, high-frequency details (also referred to as primal sketch priors) that do not exist in the low-resolution image (e.g., edges, ridges, and/or corners) are extracted from a number of training images and used to construct the high-resolution image. Markov chain inferencing may also be used, in part, to eliminate noise along commonly occurring straight lines. The resulting image lacks the artifacts present in images generated by current prior art applications.

Overview

FIG. 5 illustrates the resulting image after application of generic image hallucination to the sample bird image. As shown, the artifacts that are present in FIGS. 2-4 are absent form FIG. 5. For example, while FIG. 5 has more details than the other images (FIGS. 2-4), the "jaggy" edges of the bird's beak are absent in FIG. 5. Accordingly, FIG. 5 provides the closest hallucinated image to the original image of FIG. 1.

Figure 6:
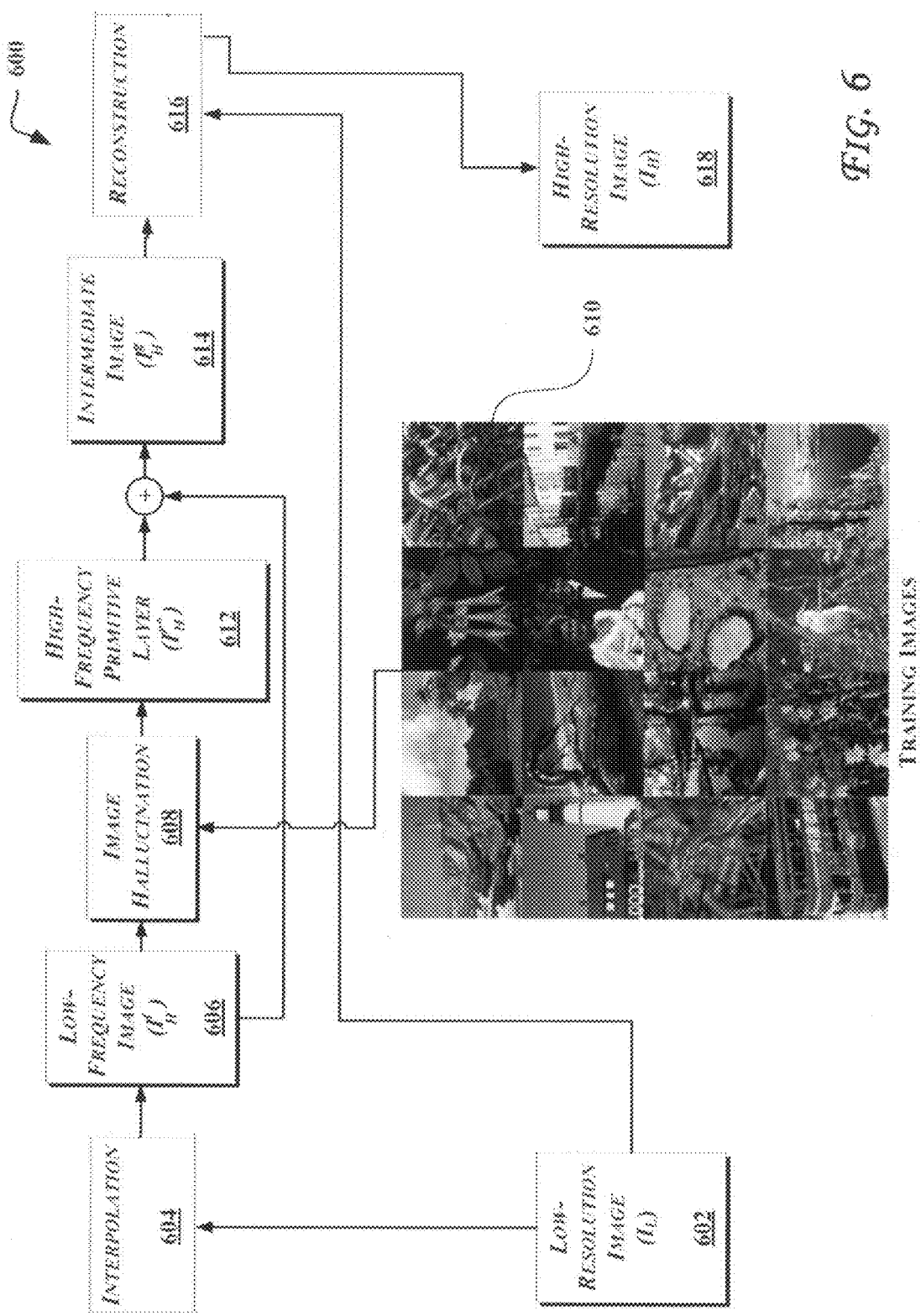
FIG. 6 illustrates an exemplary flow 600 for generic image hallucination.

FIG. 6 illustrates an exemplary flow 600 for generic image hallucination. FIGS. 7-11 illustrate sample images corresponding to different stages of the flow diagram of FIG. 6. A low-resolution image $I_L$ (602) is optionally interpolated (604) and a low-frequency image $I_H^l$ is generated (606). FIG. 7 illustrates a sample low-resolution image $I_L$ of the stage 602 and FIG. 8 illustrates a sample low-frequency image $I_H^l$ generated at the stage 606. The interpolation applied may be bicubic in one implementation. Image hallucination is applied to the low-frequency image $I_H^l$ (608). The image hallucination 608 utilizes training images 610. The training images 610 are produced by comparing pairs of low resolution and high resolution versions of a same image as will be further discussed with reference to FIG. 16.

A high-frequency primitive layer $I_H^{p^*}$ is generated (612) from the image hallucination stage 608. FIG. 9 illustrates a sample high-frequency primitive layer $I_H^{p^*}$ generated at the stage 612. The high-frequency primitive layer $I_H^{p^*}$ is combined with the low-frequency image $I_H^l$ to generate an intermediate image $I_H^g$ (614). FIG. 10 illustrates a sample intermediate image $I_H^g$ at the stage 614. An optional reconstruction stage 616 utilizes the intermediate image $I_H^g$ and the low-resolution image $I_L$ to generate a high-resolution image $I_H$ (618). FIG. 11 illustrates a sample high-resolution image $I_H$ at the stage 618.

Accordingly, the lost high frequency information of primitives (e.g., edges, ridges, and corners) is hallucinated in the image (608), but not the non-primitive parts of the image. The primitive part of the image is hallucinated, in part, because the priors of primitives (also referred to as "primal sketch priors") can be learned, but the priors of non-primitives can not be learned.

The maximum a posterior (MAP) of primitive layer $I_H^p$ is hallucinated (612) from $I_H^l$ and prior $p(I_H^p)$:

$$I_H^{p^*} = \arg\max p(I_H^p | I_H^l) = \arg\max p(I_H^l | I_H^p) p(I_H^p) \qquad (1)$$

After getting hallucinated primitive layer $I_H^p$, the intermediate result $I_H^g$ (614) can be obtained that does not satisfy the reconstruction constraint in general. To satisfy the reconstruction (616), backprojection may be applied. Backprojection is generally an iterative gradient-based minimization method to minimize the reconstruction error:

$$I_H^{t+1} = I_H^t + (((I_H^t * h) \downarrow s - I_L) \uparrow s) * p \qquad (2)$$

where p is a backprojection filter; $I_H^t$ and $I_H^{t+1}$ are input image and output images at times t and t+1; h is a blurring operator determined by the point spread function (PSF) of the imaging sensor (when lacking knowledge of the sensor, it is assumed that h is a Gaussian); $\uparrow s$ is an up-sampling operator by a factor s; and $\downarrow s$ is a down-sampling operator by a factor s. In an implementation, p is a simple Gaussian filter. Hence, in the implementation of FIG. 6, the final solution $I_H$ (618) is obtained by using $I_H^g$ as the starting point for backprojection.

Primal Sketch

As discussed above, the stage 608 of FIG. 6 utilizes an example-based approach to improve the image hallucination (e.g., done by the stage 608 of FIG. 6). The example-based approach discussed herein learns two items from the training data (such as the images 610). The first learned item is the primal sketch prior $p(I_H^p)$ (which is extracted from the training data). This prior is actually represented by a collection of examples in a non-parametric form. The second learned item is the statistical relationship between the low-frequency primitives (i.e., resulting from the interpolation of the low-resolution primitive) and high frequency primitive (i.e., the difference between the high-resolution primitive and low-frequency primitives). Each example consists of a pair of primitives. These pairs capture the statistical relationship of interest.

In one implementation, each image primitive may be represented by a 9×9 image patch. The primitives are extracted by the following orientation energy:

$$OE_{\sigma,\theta} = (I * f_{\sigma,\theta}^{odd})^2 + (I * f_{\sigma,\theta}^{even})^2 \qquad (3)$$

where $$f_{\sigma,\theta}^{odd}$$

and $$f_{\sigma,\theta}^{even}$$

are the first and second Gaussian derivative filters at scale σ and orientation θ.

These filters $$f_{\sigma,\theta}^{odd}$$

and $$f_{\sigma,\theta}^{even}$$

consist of a filter bank such as those shown in FIG. 12 (2 scales and 16 orientations). Patches (such as step-edge, ridge, corners, T-junction, and terminations) along the contours of the filter banks (e.g., 1202, 1204, 1206, and 1208) are extracted to generate primal sketch priors for use in image hallucination (e.g., the stage 608 of FIG. 6). Typical patches in a subclass are shown in FIG. 13.

In an implementation, based on pattern theory, the observed image primitive x is generated by the latent pattern z underlying some global geometric and photometric transformations, such as translation, scaling, orientation, and lighting. The generative model of image primitive B can be defined as:

$$B = c \cdot G_t G_0 G_s z + d \qquad (4)$$

where c is contrast, d is direct current (DC) bias for lighting, and $G_t$, $G_s$, and $G_0$ are translation, scaling, and orientation transformation matrices, respectively. The local transformations such as sub-pixel location, curvature, and local intensity variations, are absorbed into z.

To reduce the dimensionality of primitives, it can be assumed that the statistical relationship between low frequency primitives and high frequency primitives is independent of some transformations including contrast, DC bias, and translation. Let $B^l$ be a low frequency primitive and $B^h$ be a corresponding high frequency primitive. $B^l$ may be normalized to get a normalized low frequency primitive $\hat{B}^l$ as follows:

$$\hat{B}^l = \frac{1}{c^l} \cdot G_t^{-1}(B^l - d^l) = G_0 G_s z^l \qquad (5)$$

where $G_t$ is approximated by I because the center of each primitive extracted is on the contour, DC bias d is estimated by the mean E[B], and the contrast c is estimated by E[|B−E[B]|].

Each example consists of a normalized low frequency primitive $\hat{B}^l$, its contrast $C^l$, and a high frequency primitive $B^h$. The primal sketch priors are represented by all the examples in a non-parametric way.

In an implementation, only the primitive are utilized for hallucination because of the low dimensionality of the primitive manifold. On the other hand, the dimensionality of the non-primitive manifold is too high to be represented well by the number of examples afforded computationally. This observation can be demonstrated by statistical analysis on an empirical data set. Generally, humans are more sensitive to the high contrast intensity changes because strong stimuli are produced in the visual field by the structural elements (i.e., primitives in image).

To evaluate the generalization capability of training data for nearest neighbor matching, a receiver operating characteristics (ROC) curve can be used to demonstrate the tradeoff between hit rate and match error. For a given match error e, the hit rate h is the percentage of test data whose match errors are less than e. Each test sample x's match error e(x) can be defined by a metric between x and the nearest sample x' in the training data. The metric $$e(x) = \frac{\|x - x'\|}{\|x\|}$$

may be utilized. At a given match error, the higher hit rate represents the better generalization of the training data. In an implementation, for convenience, each 9×9 patch extracted from an image is called component. Two ROC curves are illustrated in FIGS. 14 and 15 where the X-axis is the match error and the Y-axis is the hit rate.

Figure 14:
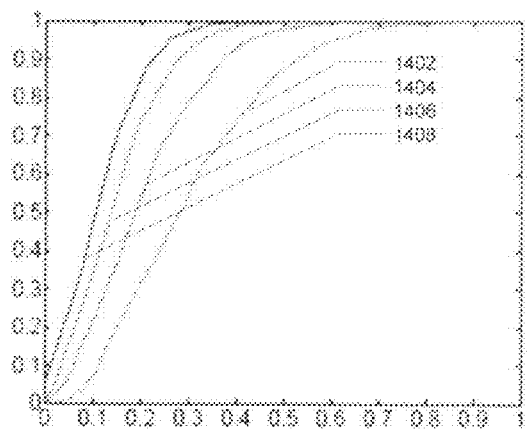
FIG. 14 illustrates the ROC curve of a primitive training data.

FIG. 14 illustrates the ROC curve of a primitive training data. This ROC curve is from a primitive training data set $D_p$ (where each example is a primitive). Curves 1402, 1404, 1406, and 1408 correspond to $10^3$, $10^4$, $10^5$ and $10^6$ ROC curves, respectively. FIG. 15 illustrates the ROC curve of component training data. This ROC curve is from component training data $D_i$ (where each example is not necessarily a primitive). In FIG. 15, curves 1502, 1504, 1506, and 1508 correspond to $10^3$, $10^4$, $10^5$, and $10^6$ ROC curves, respectively.

Moreover, an empirical data set is divided equally into training images and test images. The $D_p$ and $D_i$ sets are constructed (with uniformly sampling) from training images. Each component is normalized as well. The ROC characteristics of $D_p$ and $D_i$ are evaluated on test images. About 10,000 test samples are uniformly sampled from the test images. To reduce the sensitivity of sampling, each curve is the average result of 50 repeated experiments (i.e., the training data and test data in each experiment are re-sampled from images).

Figure 15:
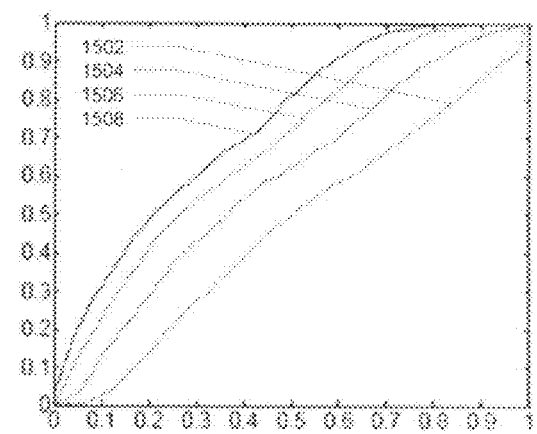
FIG. 15 illustrates the ROC curve of component training data.

Two observations may be made from the ROC curves in FIGS. 14 and 15. The first observation is that the hit rate of $D_p$ is higher than that of $D_i$ (for $|D_i|=|D_p|$) at any match error (except for 0 and 1). When $|D_p|=10^6$, the match error is less than 0.2 for 85% primitives in the test images. Furthermore, 97% of the test data can find good matching examples in $D_p$ in the error range of about 0.3. But the corresponding hit rates are 48% and 60% for $D_i$. This means about half of the components cannot find good examples in the training data if components are used for image hallucination. The second observation is that the slope of $D_p$'s ROC curve (FIG. 14) increases significantly as $|D_p|$ increases. A better ROC of $D_p$ can be expected when $N=10^7$ (e.g., 3 GB memory storage required for 9×9 patches). However, the slope of $D_i$'s ROC curve (FIG. 15) is close to a constant at different $|D_i|$. When extrapolating the curve of FIG. 15, reaching a 80% hit rate at match error of about 0.2 is unrealistic with current storage and computing capabilities.

Therefore, the primitive manifold can be represented well by a small number of examples, but the component manifold cannot. Hence, in one implementation, the primitive layer is utilized for generic image hallucination.

Image Hallucination

Figure 16:
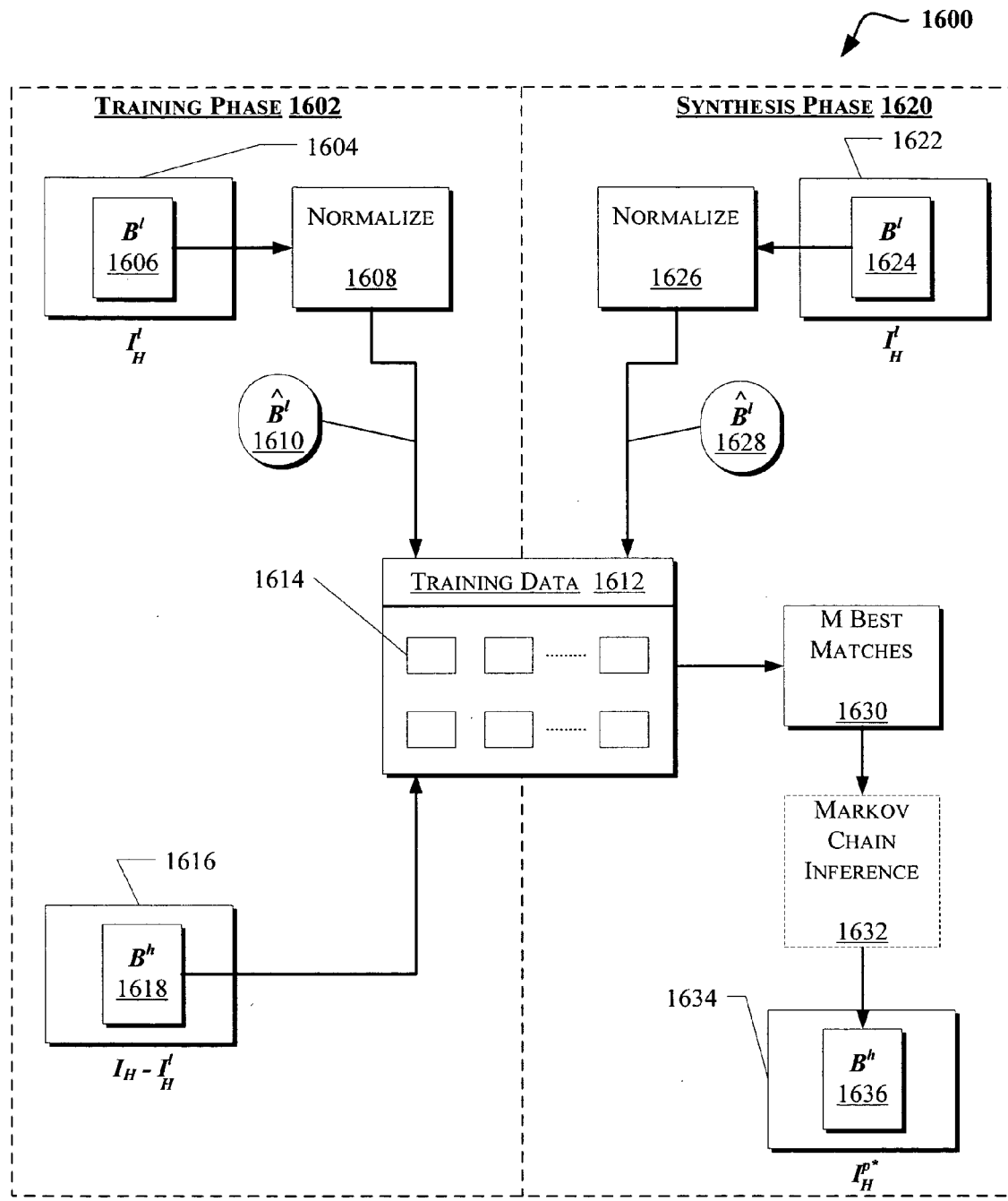
FIG. 16 illustrates an exemplary image hallucination flow 1600 for the image hallucination stage 608 of FIG. 6.

FIG. 16 illustrates an exemplary image hallucination flow 1600 for the image hallucination stage 608 of FIG. 6. The flow 1600 includes a training phase 1602. One or more low-frequency images $I_H^l$ 1604 include low-frequency primitives $B^l$ (1606). The low-frequency primitives $B^l$ are normalized (1608). The normalized low-frequency primitives 1610 are collected into training data (1612). The training data includes repositories 1614 for the training data (such as the images illustrated by 610 of FIG. 6). Similarly, one or more high-frequency images $I_H$-$I_H^l$ 1616 include high-frequency primitives $B^h$ (1618). The high-frequency primitives 1618 are also collected into the training data (1612). Accordingly, in the training phase 1602, pairs of normalized low-frequency primitive (1610) and high-frequency primitive (1618) are collected into the training data 1612.

In one implementation, the training images are derived from 16 high resolution natural images (such as the images illustrated by 610 of FIG. 6). The low-resolution images $I_L$ are simulated from the high-resolution images by blurring and down-sampling. Then, the low frequency image $I_H^l$ is interpolated (e.g., bicubically) from $I_L$ and the high frequency image is obtained from $I_H$ by subtracting $I_H^l$. The low frequency primitive $B^l$ and corresponding high frequency primitive $B^h$ are extracted from these training images. The normalized $B^l$ may be calculated in accordance with equation (5). Each example in the training data consists of $\hat{B}^l$, its contrast $c^l$, and a high frequency primitive $B^h$.

The flow 1600 also includes a synthesis phase 1620. In the synthesis phase 1620, a low frequency test image $I^l_H$ (1622) includes low frequency primitives $B^l$ (1624) which are normalized (1626). Each normalized low frequency primitive $\hat{B}^l$ (1628) in the test image is M-best matched (1630) against the training data 1612. Markov chain inference is applied to the matched primitives (1632). The final high frequency layer 1634 is generated which includes high frequency primitives $B^h$ (1636).

Markov Chain Inference

Figure 17:
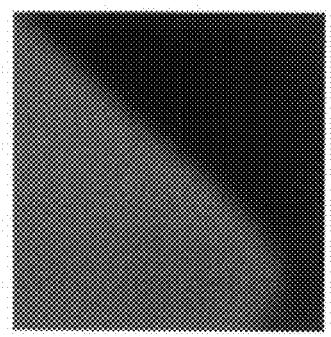
FIGS. 17-20 illustrates sample images for comparison of image data along a contour.
Figure 18:
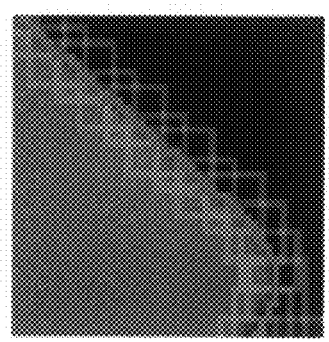

For any low resolution test image $I_L$ (such as that illustrated in FIG. 17), a low frequency $I^l_H$ image is interpolated from $I_L$ at first. It is assumed that the primitive layer $I_H^p$ to be inferred is a linear sum of a number of N high frequency primitives $\{B_n^h, n=1, \ldots, N\}$. The underlying low frequency primitives $\{B_n^l, n=1, \ldots, N\}$ in the $I_H^l$ are shown in FIG. 18. As shown, the center of each image patch is on the contours extracted in $I_H^l$ and the neighboring patches are overlapped. A straightforward nearest neighbor algorithm can be used for this task. For each low frequency primitive $B_n^l$, the normalized version ($\hat{B}_n^l$) may be obtained, followed by the best matched normalized low frequency primitive to $\hat{B}_n^l$ in the training data and the corresponding high frequency primitive may then be pasted.

Figure 19:
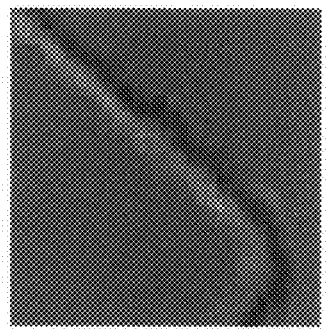
Figure 20:
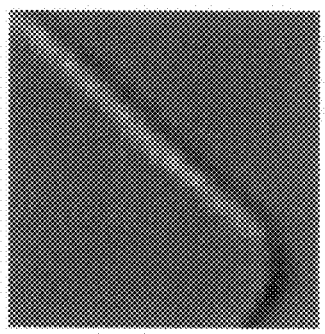

However, this simple method cannot preserve contour smoothness because the consistency of neighboring primitives is ignored, as shown in FIG. 19 which illustrates the result of the nearest neighbor algorithm. Therefore, a Markov chain based inference algorithm may be utilized to enforce the contour smoothness constraint (such as illustrated in FIG. 20).

To ensure that the high frequency primitives are consistent along the contour, the primitives are grouped into a number of K contours $C=\{C_k, k=1, \ldots, K\}$ by a greedy 8-neighbors algorithm. The joint posterior may be approximated in equation (1) by the products of the posterior of each contour as follows:

$$p(I_H^p \mid I_H^l) = p(C \mid I_H^l) \approx \prod_k p(C_k \mid I_H^l) \qquad (6)$$

Each contour $C_k$ is a first order Markov chain model as follows:

$$p(C_k \mid I_H^l) \propto \prod_i^{n_k-1} \Psi(B_i^h, B_{i+1}^h) \prod_i^{n_k} \Phi(B_i^l, B_i^h) \qquad (7)$$

where $B_i^l$ is the ith low frequency primitive on contour $C_k$ in $I_H^l$, $B_i^h$ is the corresponding high frequency primitive to be inferred, $n_k$ is the number of patches on $C_k$, $\Psi(B_i^h, B_{i+1}^h)$ is the compatibility function between two adjacent patches, $\Phi(B_i^l, B_i^h)$ is the local evidence function between $B_i^l$ and $B_i^h$.

For each $B_i^l$, the corresponding normalized primitive $\hat{B}_i^l$ is computed and the contrast $c_i^l$ by equation (5). Its scaling and orientation parameters are estimated during primitive extraction. Because the relationship between $\hat{B}_i^l$ and $B_i^h$ is one-to-multiple mapping, M (8 in one implementation) best matching normalized low frequency primitives $\{\hat{B}^l(m), m=1, \ldots, M\}$ to $\hat{B}_i^l$ are selected from the same subclass as $B_i^l$ in the training data. Let $B^h(m)$ and $c_m^l$ be the corresponding high frequency primitive and the contrast of $\hat{B}^l(m)$ in the training data. The number of m high frequency patches are $$\left\{ B_i^h(m) = \frac{c_i^l}{c_m^l} B^h(m), m = 1, \ldots, M \right\}.$$

The scale factor $$\frac{c_i^l}{c_m^l}$$

compensates $B^h(m)$ for the different contrasts between $\hat{B}_i^l$ and $\hat{B}^l(m)$.

Each candidate $B_i^h(m)$ is treated equally by setting $\Phi(B_i^l, B_i^h)$ to 1/M. The compatibility function $\Psi(B_i^h, B_{i+1}^h)$ is defined by the compatibility of neighboring patches, $\Psi(B_i^h, B_{i+1}^h) = \exp(-(d(B_i^h, B_{i+1}^h)/\sigma_d^2))$, where $d(B_i^h, B_{i+1}^h)$ is the sum squared difference (SSD) of the overlapping region between $B_i^h$ and $B_{i+1}^h$, and $\sigma_d$ is a tuning variance.

In an implementation, the optimal MAP solution of (7) for each contour $C_k$ is obtained by running the belief propagation (BP) algorithm. The BP algorithm is an iterative inference algorithm that propagates messages in the network. In equation (7), each contour $C_k$ is a chain network and the BP algorithm can obtain the optimal solution if the network is a chain (as provided here).

Hardware Implementation

Figure 21:
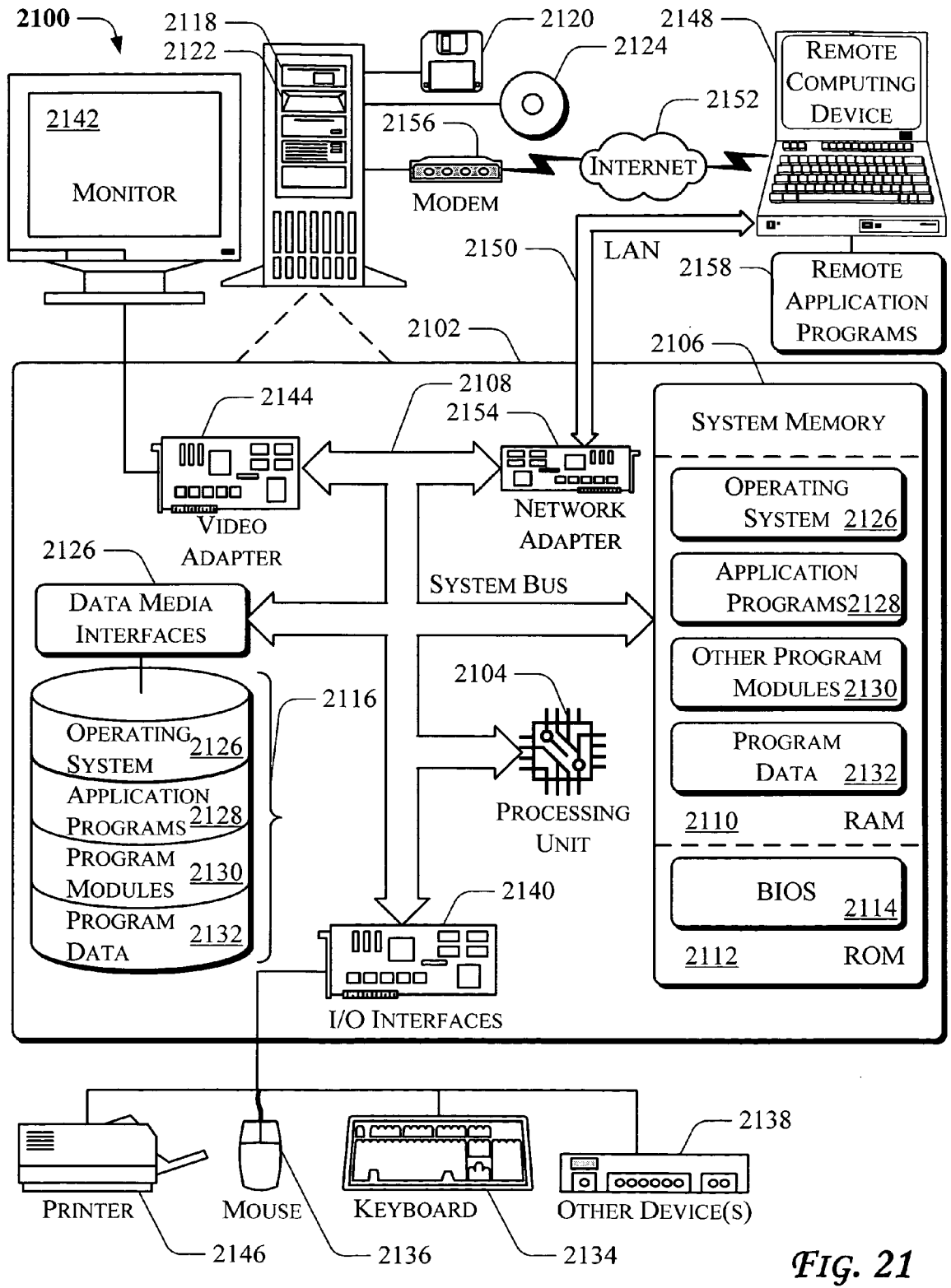
FIG. 21 illustrates a general computer environment 2100, which can be used to implement the techniques described herein.

FIG. 21 illustrates a general computer environment 2100, which can be used to implement the techniques described herein. The computer environment 2100 is only one example of a computing environment and is not intended to suggest any limitation as to the scope of use or functionality of the computer and network architectures. Neither should the computer environment 2100 be interpreted as having any dependency or requirement relating to any one or combination of components illustrated in the exemplary computer environment 2100.

Computer environment 2100 includes a general-purpose computing device in the form of a computer 2102. The components of computer 2102 can include, but are not limited to, one or more processors or processing units 2104 (optionally including a cryptographic processor or co-processor), a system memory 2106, and a system bus 2108 that couples various system components including the processor 2104 to the system memory 2106.

The system bus 2108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 2102 typically includes a variety of computer-readable media. Such media can be any available media that is accessible by computer 2102 and includes both volatile and non-volatile media, removable and non-removable media.

The system memory 2106 includes computer-readable media in the form of volatile memory, such as random access memory (RAM) 2110, and/or non-volatile memory, such as read only memory (ROM) 2112. A basic input/output system (BIOS) 2114, containing the basic routines that help to transfer information between elements within computer 2102, such as during start-up, is stored in ROM 2112. RAM 2110 typically contains data and/or program modules that are immediately accessible to and/or presently operated on by the processing unit 2104.

Computer 2102 may also include other removable/non-removable, volatile/non-volatile computer storage media. By way of example, FIG. 21 illustrates a hard disk drive 2116 for reading from and writing to a non-removable, non-volatile magnetic media (not shown), a magnetic disk drive 2118 for reading from and writing to a removable, non-volatile magnetic disk 2120 (e.g., a "floppy disk"), and an optical disk drive 2122 for reading from and/or writing to a removable, non-volatile optical disk 2124 such as a CD-ROM, DVD-ROM, or other optical media. The hard disk drive 2116, magnetic disk drive 2118, and optical disk drive 2122 are each connected to the system bus 2108 by one or more data media interfaces 2126. Alternatively, the hard disk drive 2116, magnetic disk drive 2118, and optical disk drive 2122 can be connected to the system bus 2108 by one or more interfaces (not shown).

The disk drives and their associated computer-readable media provide non-volatile storage of computer-readable instructions, data structures, program modules, and other data for computer 2102. Although the example illustrates a hard disk 2116, a removable magnetic disk 2120, and a removable optical disk 2124, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 2116, magnetic disk 2120, optical disk 2124, ROM 2112, and/or RAM 2110, including by way of example, an operating system 2126, one or more application programs 2128, other program modules 2130, and program data 2132. Each of such operating system 2126, one or more application programs 2128, other program modules 2130, and program data 2132 (or some combination thereof) may implement all or part of the resident components that support the distributed file system. Example of program modules and data is discussed below with reference to FIG. 22.

A user can enter commands and information into computer 2102 via input devices such as a keyboard 2134 and a pointing device 2136 (e.g., a "mouse"). Other input devices 2138 (not shown specifically) may include a microphone, joystick, game pad, satellite dish, serial port, scanner, and/or the like. These and other input devices are connected to the processing unit 2104 via input/output interfaces 2140 that are coupled to the system bus 2108, but may be connected by other interface and bus structures, such as a parallel port, game port, or a universal serial bus (USB).

A monitor 2142 or other type of display device can also be connected to the system bus 2108 via an interface, such as a video adapter 2144. In addition to the monitor 2142, other output peripheral devices can include components such as speakers (not shown) and a printer 2146 which can be connected to computer 2102 via the input/output interfaces 2140.

Computer 2102 can operate in a networked environment using logical connections to one or more remote computers, such as a remote computing device 2148. By way of example, the remote computing device 2148 can be a personal computer, portable computer, a server, a router, a network computer, a peer device or other common network node, game console, and the like. The remote computing device 2148 is illustrated as a portable computer that can include many or all of the elements and features described herein relative to computer 2102.

Logical connections between computer 2102 and the remote computer 2148 are depicted as a local area network (LAN) 2150 and a general wide area network (WAN) 2152. Such networking environments are commonplace in offices, enterprise-wide computer networks, intranets, and the Internet.

When implemented in a LAN networking environment, the computer 2102 is connected to a local network 2150 via a network interface or adapter 2154. When implemented in a WAN networking environment, the computer 2102 typically includes a modem 2156 or other means for establishing communications over the wide network 2152. The modem 2156, which can be internal or external to computer 2102, can be connected to the system bus 2108 via the input/output interfaces 2140 or other appropriate mechanisms. It is to be appreciated that the illustrated network connections are exemplary and that other means of establishing communication link(s) between the computers 2102 and 2148 can be employed.

In a networked environment, such as that illustrated with computing environment 2100, program modules depicted relative to the computer 2102, or portions thereof, may be stored in a remote memory storage device. By way of example, remote application programs 2158 reside on a memory device of remote computer 2148. For purposes of illustration, application programs and other executable program components such as the operating system are illustrated herein as discrete blocks, although it is recognized that such programs and components reside at various times in different storage components of the computing device 2102, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Exemplary Application Programs and Data

Figure 22:
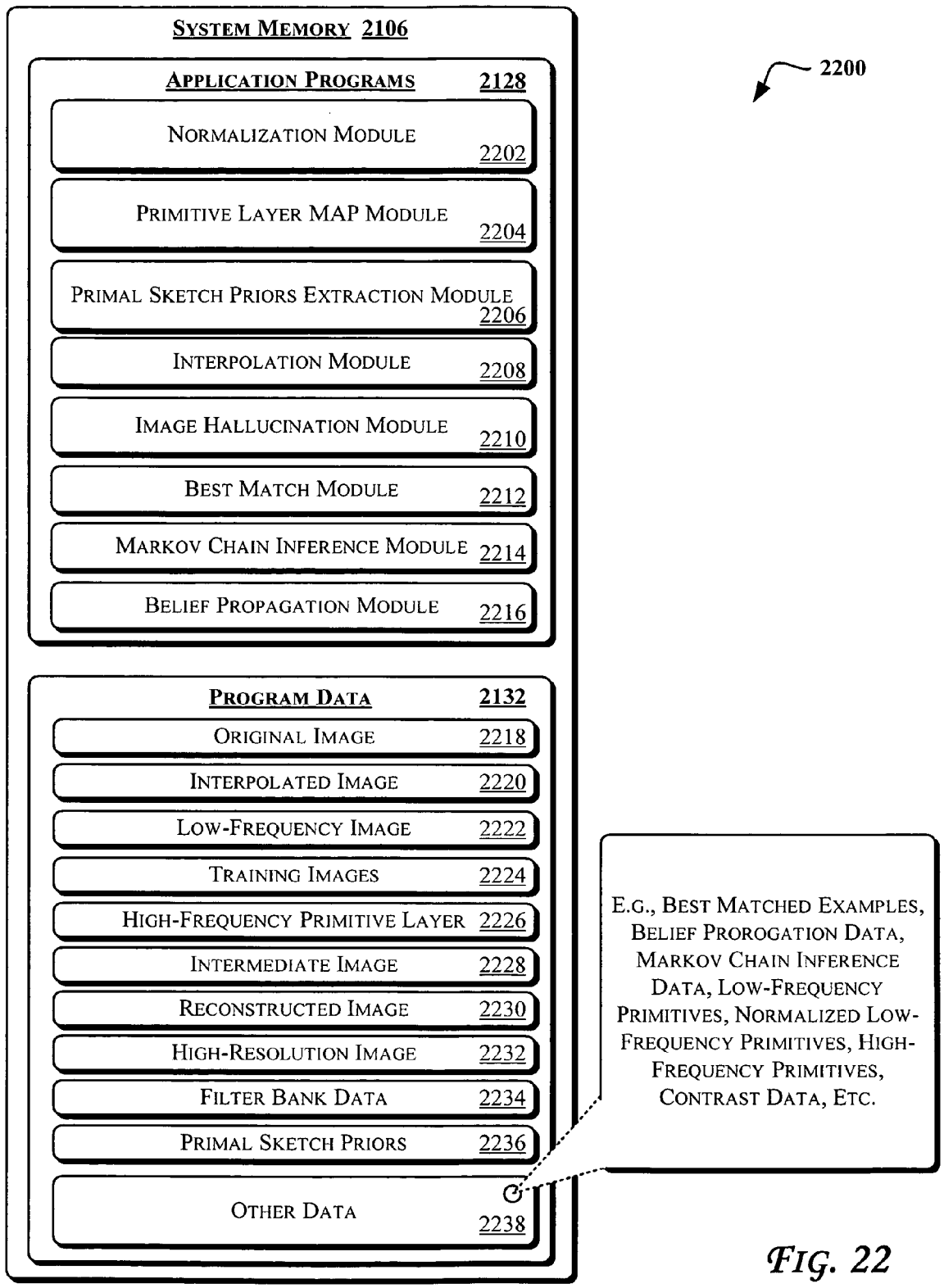
FIG. 22 illustrates an exemplary block diagram that shows further details of the system memory 2106 of FIG. 21.

FIG. 22 illustrates an exemplary block diagram that shows further details of the system memory 2106 of FIG. 21, including the application programs 2128 and the program data 2132 to provide generic image hallucination. In this implementation, the application programs 2128 includes, for example:

- a normalization module 2202 (e.g., to perform tasks associated with normalizing data, including those discussed with reference to 1608, 1626, and 1632 of FIG. 16);
- a primitive layer map module 2204 (e.g., to provide a primitive layer map such as discussed with reference to 612 of FIG. 6);
- a primal sketch priors extraction module 2206 (e.g., to extract the primal sketch priors from the training data 610 of FIG. 6);
- an interpolation module 2208 (e.g., to provide interpolation such as discussed with reference to stage 604 of FIG. 6);
- an image hallucination module 2210 (e.g., to utilize the primal sketch priors to improve a low-resolution image by replacing one or more low-frequency primitives extracted from the low-resolution image with corresponding ones of the primal sketch priors such as discussed with reference to the stage 608 of FIG. 6);
- a best match module 2212 (e.g., to provide the best match discussed with reference to 1630 of FIG. 16);
- a Markov chain inference module 2214 (e.g., to provide contour smoothness such as the Markov chain inference discussed with reference to 1632 of FIG. 16); and/or
- a belief propagation module 2216 (e.g., to provide optimal solutions for the Markov chain analysis such as discussed with reference to 1632 of FIG. 16).

The program data 2132 (which may be utilized by one or more of the application programs 2128) includes an original image 2218, an interpolated image 2220, a low-frequency image 2222, training images 2224, a high-frequency primitive layer 2226, an intermediate image 2228, a reconstructed image 2230, a high-resolution image 2232, filter bank data 2234, primal sketch priors 2236, and other data 2238 (such as those shown in FIG. 22).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of generating a high-resolution image from a generic low-resolution image, the method comprising:
    extracting a plurality of low-frequency primitives from a low-resolution image;
    replacing one or more respective ones of the plurality of low-frequency primitives with corresponding primitives from stored training data to provide a high-frequency primitive layer of the low-resolution image interpolating the low-resolution image to provide a low-frequency image prior to the extracting;
    combining the high-frequency primitive layer with the low-frequency image to provide an intermediate image; and
    reconstructing the intermediate image by applying backprojection to provide a high-resolution image, wherein the backprojection is provided as follows:

$$I_H^{t+1} = I_H^t + (((I_H^t * h) \downarrow s - I_L) \uparrow s) * p$$

where p is a backprojection filter; $I_H^t$ and $I_H^{t+1}$ are input image and output images at times t and t+1; h is a blurring operator determined by the point spread function of the imaging sensor; $\uparrow s$ is an up-sampling operator by a factor s; and $\downarrow s$ is a down-sampling operator by a factor s.

2. A method as recited in claim 1, wherein the high-frequency primitive layer comprises a plurality of high-frequency primitives.

3. A method as recited in claim 1, wherein the stored training data comprises a plurality of primal sketch priors.

4. A method as recited in claim 1, wherein the stored training data is provided by comparing pairs of low-resolution and high-resolution versions of a same training image.

5. A method as recited in claim 1, further comprising normalizing the plurality of low-frequency primitives prior to the replacing.

6. A method as recited in claim 1, further comprising applying Markov chain inference to the high-frequency primitive layer to provide contour smoothness.

7. A method as recited in claim 1, further comprising interpolating the low-resolution image to provide a low-frequency image prior to the extracting.

8. A method as recited in claim 1, further comprising bicubically interpolating the low-resolution image to provide a low-frequency image prior to the extracting.

9. A method comprising:
    hallucinating a low-frequency image ($I_H^l$);
    extracting a high-frequency primitive layer ($I_H^{p*}$) of the hallucinated low-frequency image;
    combining the low-frequency image ($I_H^l$) and the high-frequency primitive layer ($I_H^{p*}$) to provide an intermediate image ($I_H^g$);
    reconstructing the intermediate image ($I_H^g$) to provide a high-resolution image ($I_H$), wherein the reconstructing applies backprojection to the intermediate image ($I_H^g$) to provide the high-resolution image ($I_H$), wherein the backprojection is provided as follows:

$$I_H^{t+1} = I_H^t + (((I_H^t * h) \downarrow s - I_L) \uparrow s) * p$$

where p is a backprojection filter; $I_H^t$ and $I_H^{t+1}$ are input image and output images at times t and t+1; h is a blurring operator determined by the point spread function of the imaging sensor; $\uparrow s$ is an up-sampling operator by a factor s; and $\downarrow s$ is a down-sampling operator by a factor s.

10. A method as recited in claim 9, further comprising interpolating a low resolution image ($I_L$) to provide the low-frequency image ($I_H^l$).

11. A method as recited in claim 9, further comprising bicubically interpolating the low resolution image ($I_L$) to provide the low-frequency image ($I_H^l$).

12. A method as recited in claim 9, wherein the high-frequency primitive layer ($I_H^{p*}$ is provided as follows:

$$I_H^{p*} = \text{argmax } p(I_H^p|I_H^l) = \text{argmax} p(I_H^l|I_H^p)p(I_H^p).$$

13. One or more computer-readable media having instructions stored thereon that, when executed, direct a machine to perform acts comprising:
   extracting a plurality of low-frequency primitives from a low-resolution image;
   replacing one or more respective ones of the plurality of low-frequency primitives with corresponding primitives from stored training data to provide a high-frequency primitive layer of the low-resolution image
   interpolating the low-resolution image to provide a low-frequency image prior to the extracting;
   combining the high-frequency primitive layer with the low-frequency image to provide an intermediate image; and
   reconstructing the intermediate image by applying backprojection to provide a high-resolution image, wherein the backprojection is provided as follows:

$$I_H^{t+1} = I_H^t + (((I_H^t * h) \downarrow s - I_L) \uparrow s) * p$$

where p is a backprojection filter; $I_H^t$ and $I_H^{t+1}$ are input image and output images at times t and t+1; h is a blurring operator determined by the point spread function of the imaging sensor; $\uparrow s$ is an up-sampling operator by a factor s; and $\downarrow s$ is a down-sampling operator by a factor s.

14. A computer-readable media as recited in claim 13, wherein the acts further comprise normalizing the plurality of low-frequency primitives prior to the replacing.

15. A computer-readable media as recited in claim 13, wherein the acts further comprise applying Markov chain inference to the high-frequency primitive layer to provide contour smoothness.

16. A computer-readable media as recited in claim 13, wherein the acts further comprise interpolating the low-resolution image to provide a low-frequency image prior to the extracting.

17. A computer-readable media as recited in claim 13, wherein the acts further comprise bicubically interpolating the low-resolution image to provide a low-frequency image prior to the extracting.

18. An apparatus comprising:
   means for extracting a plurality of low-frequency primitives from a low-resolution image; and
   means for replacing one or more respective ones of the plurality of low-frequency primitives with corresponding primitives from stored training data for providing a high-frequency primitive layer of the low-resolution image
   means for interpolating the low-resolution image to provide a low-frequency image prior to the extracting;
   means for combining the high-frequency primitive layer with the low-frequency image to provide an intermediate image; and
   means for reconstructing the intermediate image by applying backprojection to provide a high-resolution image, wherein the backprojection is provided as follows:

$$I_H^{t+1} = I_H^t + (((I_H^t * h) \downarrow s - I_L) \uparrow s) * p$$

where p is a backprojection filter; $I_H^t$ and $I_H^{t+1}$ are input image and output images at times t and t+1; h is a blurring operator determined by the point spread function of the imaging sensor; $\uparrow s$ is an up-sampling operator by a factor s; and $\downarrow s$ is a down-sampling operator by a factor s.

19. An apparatus as recited in claim 18, further comprising means for normalizing the plurality of low-frequency primitives prior to the replacing.

20. An apparatus as recited in claim 18, further comprising means for applying Markov chain inference to the high-frequency primitive layer to provide contour smoothness.

21. An apparatus as recited in claim 18, further comprising means for interpolating the low-resolution image to provide a low-frequency image prior to the extracting.

22. An apparatus as recited in claim 18, further comprising means for bicubically interpolating the low-resolution image to provide a low-frequency image prior to the extracting.

* * * * *